April 19, 1932.  C. B. GRAY  1,854,254
CUTTING MACHINE
Filed Nov. 22, 1929  3 Sheets-Sheet 1
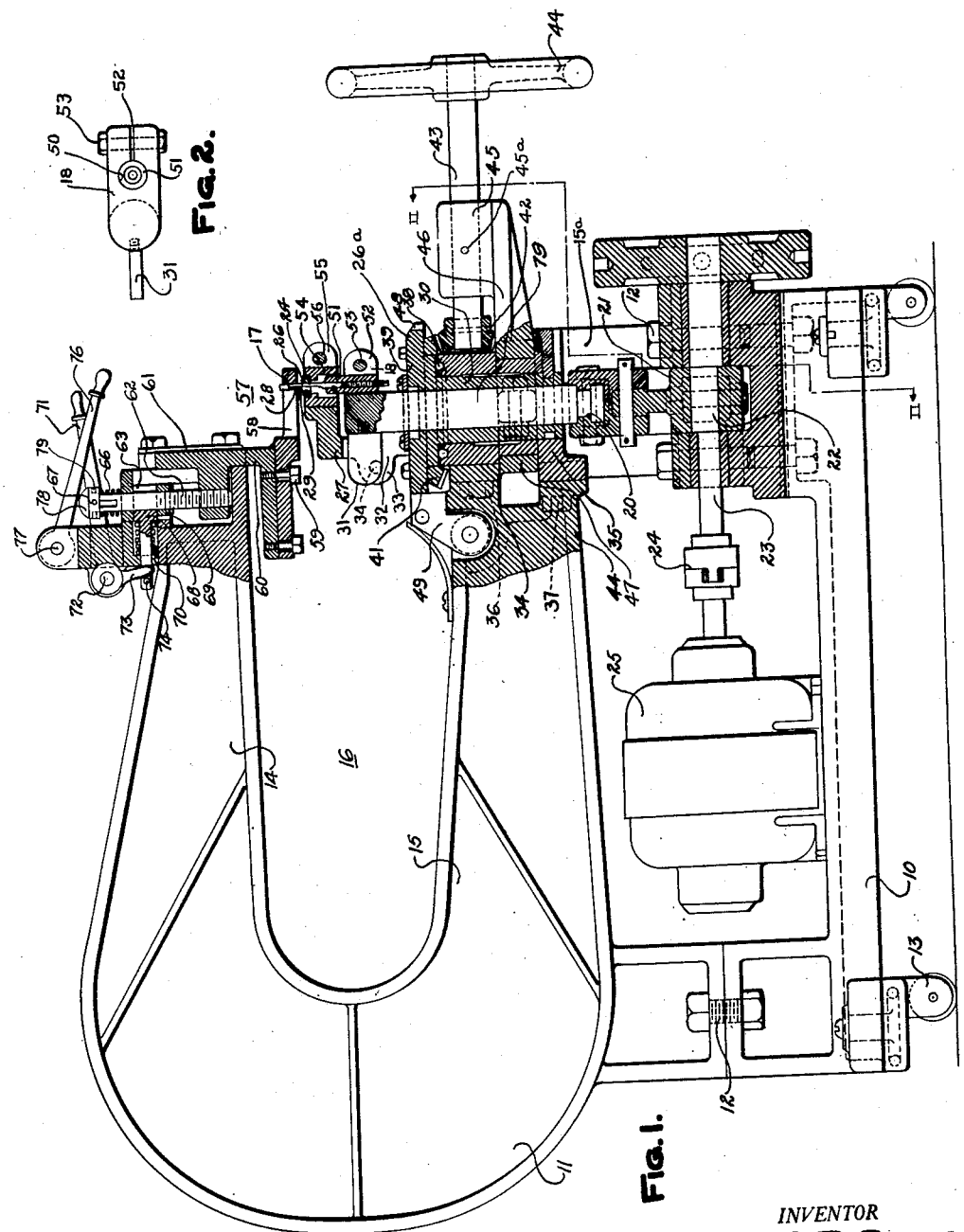
INVENTOR
C.B.GRAY.
BY
ATTORNEY April 19, 1932.  C. B. GRAY  1,854,254
CUTTING MACHINE
Filed Nov. 22, 1929   3 Sheets-Sheet 2
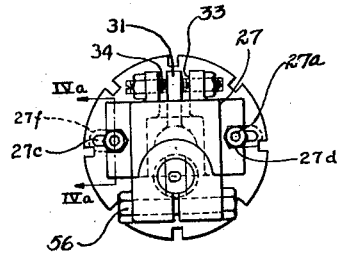
Fig. 4.
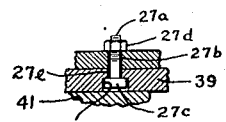
Fig. 4a.
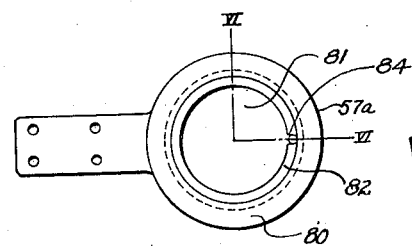
Fig. 5.
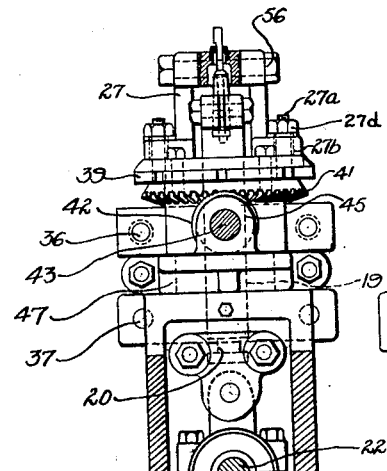
Fig. 3.
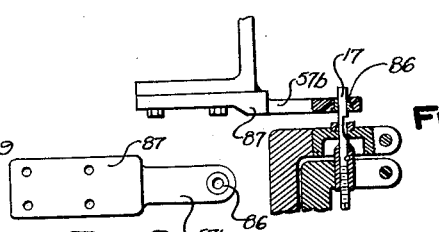
Fig. 6.
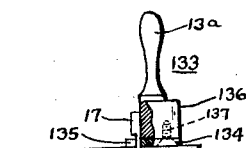
Fig. 7.
Fig. 8.
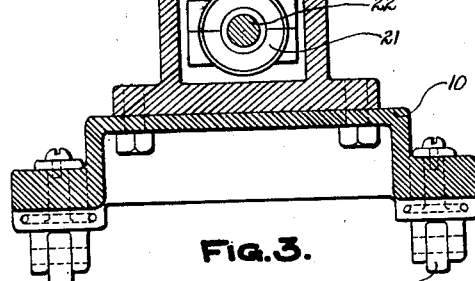
Fig. 31.
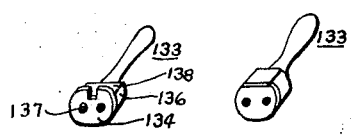
Fig. 32.  Fig. 33.
INVENTOR
C. B. GRAY.
BY
a. B. Reavis
ATTORNEY April 19, 1932.  C. B. GRAY  1,854,254

CUTTING MACHINE

Filed Nov. 22, 1929  3 Sheets-Sheet 3

INVENTOR
C.B.GRAY.
BY
A. B. Reavis
ATTORNEY

Patented Apr. 19, 1932

1,854,254

UNITED STATES PATENT OFFICE

CHARLES B. GRAY, OF MILLBOURNE, PENNSYLVANIA

CUTTING MACHINE

Application filed November 22, 1929. Serial No. 409,070.

My invention relates to cutting machines more particularly of the broach type and it has for an object to improve machines of this character from the standpoints of structure and mode of operation.

A machine of the general character indicated, where the reciprocatory tool is of the broach type operating in a die and cutting material arranged above the die by a pulling down movement, is old in the art. An object of my invention is to provide a machine of this character with a stripper serving to prevent rising of the stock with the tool in order that the cutting edge of the tool may rise above the stock permitting of feeding movement of the latter whereby successive and overlapping cuts may be made rapidly and any suitable sheet form material cut or slotted.

A further object of my invention is to provide a machine of the above character having improved centering fastening means and adjustment features providing for accurate alignment of the cooperating tool and die.

A further object of my invention is to provide a machine of the above character with a frame whose lower arm carries the cutting parts and whose upper arm is sufficiently strong and has a connection with the lower arm of sufficient strength to provide a firm and steady support for the stripper.

A further object of my invention is to provide a machine of the above character with means to turn the tool and the die.

A further object of my invention is to provide a machine of this character wherein the die and tool may be adjusted to secure alignment and are not subject to misalignment after setting even though the head is rotated in making angular or radial cuts without turning the stock.

A further object of my invention is to provide a cutting machine having the ram, tool, and the operating and controlling mechanism arranged below the die, whereby strength of the machine and economy of construction are promoted.

These and other objects are effected by my invention, as will be apparent from the following description and claims taken in connection with the accompanying drawings, forming a part of this application, in which:

Fig. 1 is a side elevation of my improved machine with certain parts shown in section;

Fig. 2 is a detail plan view of the upper end of the ram of the machine;

Fig. 3 is a detail end elevational view of Fig. 1 with parts shown in section taken along the line II—II of Fig. 1 and viewed in the direction of the arrows;

Fig. 4 is a plan view of the die support of Fig. 1;

Fig. 4a is a sectional detail view along line IVa—IVa of Fig. 4.

Fig. 5 is a detail view showing a modified form of stripper;

Fig. 6 is a sectional view taken along the line VI—VI of Fig. 5;

Fig. 7 is a fragmentary view of parts of Fig. 1 showing a further modified form of stripper;

Fig. 8 is a plan view of the stripper shown in Fig. 7;

Fig. 9 is a sectional detail view showing the tool and die axially aligned with the ram;

Figs. 10 to 15, inclusive, are detail views of forms of dies and die holders;

Figs. 16, 17, 18 and 19 are detail views of different forms of tool holders, Fig. 19 being a section along line XIX—XIX of Fig. 18;

Figs. 20 and 21 are diagrammatic views illustrating principles of design of my improved tool;

Figs. 22 to 27, inclusive, are detail views showing different forms of cutting tool;

Figs. 28 and 28a are detail views of a modified form of tool holder;

Figs. 29 and 30 are detail views showing a modified form of stripper;

Fig. 31 shows a modified form of machine and a hand stripper; and

Figs. 32 and 33 show two different types of hand strippers for use with the machine shown in Fig. 31.

Referring now to the drawings more in detail, I show, in Fig. 1, a frame preferably consisting of a bed portion 10 and a yoke portion 11 secured together by bolts 12. The bed portion 10 may be provided with casters 13 so that the machine may be suitably disposed with respect to work. Preferably the casters are removable to provide for stationary operation. The yoke has upper and lower arms 14 and 15 provided, respectively, with stripping and cutting apparatus, and between the arms there is the usual throat space 16.

Referring now to the cutting apparatus, in Fig. 1, the broach tool 17, more particularly hereinafter described, is carried by the eccentric portion 18 of the ram 19 connected by a swivel joint 20 to the strap 21 disposed about th eccentric portion 22 of the drive shaft 23, the latter being connected by the coupling 24 to any suitable source of power, for example an electric motor 25 preferably carried by the bed portion 10.

The broach tool 17 is movable through and guided by a die 26 carried by a suitable support 27 provided on the rotatable head 26a. The tool has an upper, downwardly directed cutting face 28 provided by the relieved portion 29. On up strokes of the ram, the cutting face 28 of the broach rises above the work, due to the cooperation of the stripper, and the work is then fed to the extent permitted by the neck of the broach. On downstrokes of the ram, the cutting face 28 cooperates with the die 26 to cut the work.

As the broach tool of Fig. 1 is carried eccentrically with respect to the ram, the die is likewise disposed eccentrically, the support 27 being suitably formed for this purpose. This eccentric arrangement not only makes the holding devices for the die and tool accessible but also provides for very strong connections and provides for the tool and die being turned by pressure of work.

The broach tool 17 is adjustable with the ram 19 about the axis of the latter in order to change the direction of feed, the die support 27 being movable angularly with the ram 19 to maintain the die in proper relation with respect to the tool. To this end, the rotatable head 26a is provided with a ram guide bushing 30 and a slidable key connection is arranged between the head and the ram. In Fig. 1, I show, by way of example, a tongue 31 connected to the ram and arranged in a slot or guide 32 in the head. As shown in Figs. 1 and 4, the guide 32 is provided by spaced ears 33 on the die support 27 and screws 34 are carried by the ears. By adjusting the screws, relative angular adjustments of the tool with respect to the die may be made.

If the head 26a is turned, the ram and die support connected thereto will also be turned. The head is supported for turning movement by the pedestal structure 15a of the frame; and, to this end, it is journalled in the vertical bearing 35 forming a part of the pedestal structure and connected at 36 and 37 to the lower arm 15.

A thrust bearing 38 is arranged between the upper end of the bearing 35 and the overhanging flange part 39 of the head 26a and it serves to transmit working stresses to the frame, affords adequate support for the die, and permits at all times of the head 26a being readily turned.

The die support 27 is connected to the head flange 39 in any suitable manner. For example, I show bolts or screws 27a (Figs. 3 and 4) connected to the flange and having shanks preferably fitting in open-ended slots 27b in the die support. The slots 27b are somewhat larger than the shanks, whereby, when the bolts or screws are loosened, the die support may be adjusted to bring the die into proper alignment with the tool. I show the bolts having nuts 27d preferably arranged above the bottom flanges of the support 27, their shanks arranged in the slots 27b and 27e, and their heads 27c located in the counter-slots 27f. Hence, the support may be readily detached or adjusted with loosening of the nuts and without removal of the bolts. If the support is to be removed, the nuts are loosened and the bolts are shifted outwardly in the slots to disengage the bolts from the support flanges. This connection also provides for the substitution of a support, for example, that of Fig. 9, where the die 13 is centrally aligned with the ram.

The head 26a may be turned by any suitable means. For example, I show a bevel gear 41 connected to the flange 39 and meshing with the bevel pinion 42 carried by the shaft 43 provided with a handwheel 44. The shaft 43 is supported by a bearing 45 provided on an arm 46 having a supporting bearing portion 47 journalled on the bearing 35. If the handwheel is turned, the head 26a and the ram 19 will also be turned, the swivel connection 20 permitting of the ram turning. Also, rotary adjustment of the head and its die support may be had by restraining the shaft 43 from free rotation, for example by the pin 45a, and rotating the latter angularly about the axis of the ram. The shaft 43 may be pulled out sufficiently to demesh the pinion 42 from the gear 41, whereupon the shaft may be moved to a desired and accessible position and the pinion and gear reengaged.

In order that the ram and tool carried thereby may be held in predetermined positions of adjustment, the periphery of the flange 39 has notches 48 with which cooperates a detent 49 carried by the arm 15.

Referring now to the eccentric mounting for the tool 17 already referred to, I show (Fig. 2) the eccentric ram arm 18 provided with a cylindrical opening 50 for the tool holder 51 to which the tool may be connected in any suitable manner. The arm 18 is split at 52 so that a cross bolt or screw 53 may be used to lock or grip the holder 51 in place.

In like manner, the die holder 54 is held in place with respect to the support 27, the latter being split or cut at 55 and a cross bolt or screw 56 being employed to clamp or grip the holder 54. The holder is preferably threaded to the support 27 to provide for up and down adjustment of the die. This form of connection not only provides for such adjustment but also assures of the die being firmly gripped in place, that is, centered, without having any side motion as the gripping is circumferential. While I show the die holder threaded to the support, a slight taper may be used instead.

In Fig. 1, an annular stripper, at 57, is carried by the upper arm 14 and it has an opening 58 within which the tool 17 extends and is arranged to turn rotarily. If desired, the tool may back against the opening wall, whereby the stripper may serve to reinforce the tool while cutting; however, I prefer to make the tool strong enough so that this is unnecessary.

The stripper, at 57, is capable of being raised to clear the tool when inserting or removing material. To this end, the stripper is connected by suitable means, for example, bolts 59, to the vertically movable slide 60 carried by a guide 61 provided on the upper arm 14 and having threaded connection with respect to the threaded rod 62 passing through gag guide 63 provided in the upper arm. A spring 66 is arranged about the rod between the head 67 on the rod and the upper surface of the guide, and such spring serves to elevate the connected rod, slide and stripper when the gag 68 fitting the guide 63 is released or unlatched from between a collar 69 on the rod and the upper wall of the guide. The gag 68 is moved inwardly to engaging or latching position by a spring 70 and it is released by a lever 71 pivoted at 72 and having a portion 73 engaging an abutment 74 on the gag. A lever 76 pivoted at 77 is arranged to engage the top 78 of the head 67 to lower the connected rod, slide and stripper, or stripper aggregate, against the force of the spring 66. The stripper may be adjusted by turning the threaded rod 62, its head having spanner openings 79 for this purpose.

The stripper in stripping material from the tool on up-strokes is subjected to stresses which may be fairly high. Hence, in Fig. 1, I show a C frame of I cross-section and the upper arm 14, as well as the curved portion joining the lower arm have webs of suitable widths to give the required rigidity or stiffness to maintain the correct relative positions of the operating parts.

In Fig. 5, I show a modified form of stripper at 57a, capable of being attached to the slide 60 by the bolts 59. This form of stripper is made up of a body member 80 having a circular opening 81 within which is arranged the floating ring 82 having an annular tongue-and-groove connection 83 with respect to the body member 80. If desired, the floating ring 82 may have a notch 84 for the tool 17 to facilitate stripping, the notch being deep enough to extend to or beyond the cutting edge so that the stripper engages the work after the first and succeeding cutting strokes. This is advantageous with thin or flexible stock in the buckling thereof sufficient to prevent feeding is avoided. In case of turning of the tool and die, the floating ring moves with the tool. Another advantage for the floating ring is that it may move to accommodate itself to the position of the tool, thereby avoiding binding or bending of the tool.

In Fig. 7, I show a stripper at 57b comprising a bushing 86 fitting the tool 17 and carried by a body member 87 attachable to the slide as heretofore. This form is advantageous in working on small parts; and, to facilitate this, the cutting edge 28 is disposed outwardly. The apparatus shown in Fig. 1 is adjusted to bring the tool and die into proper outward position, the annular stripper is removed, and the bushing type stripper is placed in position. The bushing type braces the tool for heavy work.

So far, apparatus has been described wherein the tool is eccentric to the ram. In Fig. 9, I show a die and tool in axial alignment with the ram 19a. The ram 19a has its upper end hollow, as indicated at 88; and such hollow end has internal threads 89 engaging external threads 90 on the tool holder 51a. A cross bolt 91 is provided for clamping or gripping the tool holder in proper position. The die support 27a is secured in place, as heretofore, with respect to the guide bushing 30. The form of machine shown in Fig. 1 is readily converted to that of Fig. 9 merely by substituting a ram and a die support.

The die 26 and the die holder 54 may be embodied in various ways. In Figs. 1 and 10, the die 26 has a dovetail connection with respect to a two-part holder 54 made up of the parts 92. Upon tightening the cross screw 56, not only will the holder be circumferentially gripped or clamped, but the two parts 92 will be pressed together to tighten the dovetail connection between those parts and the die 26.

In Figs. 11 and 12, I show a two-part holder and a two-part die with a dovetail connection, the die being made in two parts 93 each having a part of the die opening milled therein. This form of die may therefore be easily, accurately and economically manufactured. This form also permits of the ready renewal of the part at the cutting side.

In Figs. 13, 14 and 15, I show the die 26 connected to the holder 54 by tangent keys or cotters 94. The holder 54 may be a complete ring, as shown in Fig. 14, or it may be split, as shown in Fig. 15 to obtain a compression gripping effect.

As the die holder 54 is adjustable with respect to the support, when the die is dulled it may be dressed at the top by grinding off, after which the holder 54 is adjusted to obtain proper relative positions of the tool and of the die. Instead of adjusting the die holder the tool may be adjusted, or both.

In Figs. 16, 17 and 18, there are shown different modes of securing the broach tool to the tool holder. In Fig. 16, the holder 51a and the tool 17 are provided with a tangent opening for the cotter 95. Fig. 17 is similar to Fig. 16 except that the shank of the tool is provided with a plurality of notches 96 which may be brought into registry with the holder opening, permitting of lowering of the tool to bring the cutting face 28 into proper position relatively to the die after redressing. The holder is provided with a screw 97 to jam the lower end of the tool to make the latter tight with respect to the holder.

In Figs. 18 and 19, I show a holder 51b channeled at 98 to receive the shank 99 of the tool, the shank being rectangular in cross-section to fit the channel. A pair of pins 100 connect the tool to the holder and the screw 97a cooperates with the lower end of the tool to secure a rigid connection of the latter with respect to the holder.

In Figs. 28 and 28A, I show a further form of tool holder 51c for the tool 17 and the jam screw 97, the holder being split, as indicated at 51d, whereby, when the bolt or screw 53 is tightened the split parts of the ram arm 18 will grip or clamp the holder 51c and cause the split parts of the holder to grip the tool and the jam screw. With this form the tool may be adjusted and secured in place with respect to the holder by the tangent key or cotter and the jam screw and all the parts may be firmly held in place by tightening the ram arm cross screw or bolt.

The tool 17 consists essentially of a cutting face 28 and a feed-limiting portion 102 immediately therebelow provided by the relief 29. As cutting takes place on downstrokes of the tool, the portion 102 is subjected to tension and bending stresses. The tool may be variously shaped to withstand such stresses while at the same time permitting ready relative turning of the work and tool.

As shown in Fig. 20, the back of the tool is milled along intersecting curved surfaces 104, these curved surfaces being taken along radii of the dotted line circles a. It will be obvious that a tool having the cross-sectional shape of Fig. 20 may be used in cutting along lines of small radii of curvature; for example, in Fig. 20, the tool may be used to follow a line whose radius is as small as that of one of the circles a. By having a tool which is elongated in cross-section adequate material may be provided in the reduced or feed-limiting portion 102 to withstand severe working stresses. Fig. 21 differs from Fig. 20 in that the front or cutting side of the tool is rounded, whereas that of Fig. 20 is straight. Also, Fig. 21 shows how the cutting radius may be reduced by decreasing the radius of relief.

In Figs. 22 and 23, I show a round form of tool which is reduced at 29 in order to provide the cutting face 28. As in Fig. 21, the front face of the reduced portion is convex so that adequate strength may be provided in the reduced portion. The flats 106 at the sides of the tool assure that the transverse diameter of the tool shall not exceed the diameter of the reduced portion.

In Figs. 24 to 27, inclusive, I show further forms of tools which are elongated in cross-section. In Figs. 24 and 25 the reduced portion is substantially elliptical, whereas, in Figs. 26 and 27, the reduced portion is substantially circular in outline.

In Figs. 29 and 30, I show a modified form of stripper holder and operating mechanism. The stripper 57c is secured to the lower end of a rod 110 movable vertically with respect to guide bearings 111 and 112 carried by the upper and lower arms 113 and 114, respectively, of the unitary clevis member 115 connected to the frame arm 14 by a bolt 116, fitting openings 117 and 118 in the upper and lower arms 113 and 114, respectively, and extending through a relatively larger opening 119 in the arm 14. The larger opening provides for horizontal adjustment of the clevis 115 and the stripper carried thereby in all directions to obtain proper alignment with the tool.

The stripper carrying rod or member 110 is biased upwardly by the spring 121 arranged between the upper end of the threaded bushing 122 and the collar 123 on the rod or member 110. The rod is lowered or depressed against the force of the spring by cooperating cams 124 and 125, connected, respectively, to the rod 110 and to the operating handle or lever 126. The lower cam 124, fixed to the rod 110, is provided with a tongue arranged between a pair of spaced vertical members 128 of the clevis 115. The members 128 are provided with screws 129 which cooperate with the tongue 127 to guide and to prevent rotary play of the member 110 and the stripper.

If it is desired to adjust the stripper and rod 110 angularly, this may be done by adjusting the screws 129. The stripper, its rod 110, and the cams may be adjusted in a vertical direction by adjustment of the bushing 122 which is threaded to the clevis. Horizontal adjustments are provided for by the bolt 116 and the large opening 119.

In Figs. 31, 32 and 33, I show a modified form of apparatus wherein the C frame is omitted and a hand stripper is employed. Referring to Fig. 31, I show a bedplate 131 supporting a pedestal structure 132 carrying operating parts substantially as shown in Figs. 1 and 9 and already described. The tool 17 cooperates with a die on down strokes as heretofore described to make successive cuts in a blank to slot or cut the latter. The hand stripper 133 is used to strip the blank on upstrokes. As shown in Figs. 31 and 32, the hand stripper comprises a bottom plate 134 having a tool notch 135 and secured to the head portion 136 by screws 137. The head portion is preferably flattened or relieved at 138 to expose that portion of the plate having the notch in order that the cutting operation may be better seen and controlled. The head 136 is connected to a handle 139 so that the stripper may be suitably placed. The stripper 133 may be made sufficiently heavy so that little, if any, pressure need be exerted thereon to effect stripping.

In Fig. 33, I show a stripper 133 wherein the base plate is not notched.

My improved apparatus operates substantially as follows and has the following advantages:

Material is inserted between the stripper and the die and in proper relation with respect to the tool. The machine is then started, and the tool operates in a step-by-step manner to remove successive portions of material whereby a blank may be cut or a suitable outline followed. The cutting parts are carried by the pedestal portion of the frame, while the stripper is carried by the upper arm, as in Fig. 1, or may be embodied as a hand tool, as in Fig. 31. With a broach type of tool, it is necessary to strip the material from the tool on the up strokes; and, where considerable resistance to stripping of the material is encountered, the stripper must be rigidly and firmly held in place. Hence, in Fig. 1, I show the stripping mechanism carried by an upper arm of a C frame of I cross-section. This type of structure provides a very rigid and stiff upper arm to support the stripping mechanism. With this arrangement, it is necessary that the stripper be securely held to effect the function of stripping and to maintain the proper relation thereof with respect to the tool. If it is desired to make an inside cut in a blank, the stripper is elevated so that the blank may be placed over the tool; and, to facilitate this, gag mechanism is employed to provide for raising of the stripper. With the form shown in Fig. 31, which is particularly advantageous in cutting light or small parts, it is merely necessary to place the stripper 133 as desired.

In the preferred form of my invention shown in Fig. 1, the stripper is ring-shaped and the tool works on the inside of the ring.

In Figs. 5 and 6, I show a form of stripper where a floating ring is employed, this form preferably having the floating ring notched to fit about the broach tool 17. The latter arrangement accomplishes the stripping function somewhat better and the floating ring is capable of accommodating itself to the position of the tool. In Fig. 7, I show a form of stripper which is used when the tool and the die are moved to a position and fixed therein, this form of stripper having a guide bushing which cooperates with the upper end of the tool. The form of stripper shown in Fig. 7 is particularly useful when cutting small parts or heavy stock, as the tool may be turned to the most accessible position and the part to be cut gripped quite close to the tool.

By having the tool and the die arranged eccentrically with respect to the ram, it is possible for the work to cooperate with the tool to adjust the tool and die angularly, that is, if the direction of cutting is changed, the pressure of material on one side of the tool will serve to turn both the tool and the die until the tool is brought substantially into line with the desired cutting direction. This is especially advantageous when the machine is mounted on casters and used to cut rather large unwieldly blanks. In the latter event, the machine may be moved about on a suitable supporting floor to follow a line of cutting and the eccentric mounting of the tool and die together with movement of the latter about the axis of the ram assures that the tool may be caused to follow a desired line.

My improved machine has means for carrying the tool and the die together with adjustments which assure proper operative relation of the tool and the die. Both the tool and the die are carried by coaxial openings provided in members, the members being split so that circumferential compression or clamping may be effected without relative shifting of the tool and the die. If the die and the tool should be off-set to some extent angularly, the adjustable pin and slot connection provided between the guide support and the ram assures that these parts may be relatively adjusted until proper alignment of the tool and the die is secured. In addition to this adjustment, it will be noted that the die is carried by a support which is bolted in place with respect to the upper end of the guide bushing, the slots for these parts being somewhat larger than the bolts whereby the die support may be shifted laterally in all directions until the die is brought into proper operative relation with respect to the tool.

If it is desired to use the machine without having an off-set tool holder, then a ram may be provided which is bored out at its upper end to receive a tool holder. If the ram is changed, a die support is arranged to carry the die in axial alignment with the ram members provided. This is easily done as the die support is merely bolted to the top of the bushing.

While a tool of the broach type is shown in the drawings and hereinbefore described with reference to the drawings, it is to be understood that features of the machine may be used in connection with a tool of any suitable type.

While I have shown my invention in several forms, it will be obvious to those skilled in the art that it is not so limited, but is susceptible of various other changes and modifications without departing from the spirit thereof, and I desire, therefore that only such limitations shall be placed thereupon as are imposed by the prior art or as are specifically set forth in the appended claims.

What I claim is:

1. In a cutting machine, the combination of a power shaft; means for converting rotary motion of the shaft into reciprocatory motion and including a reciprocatory element; a ram; a swivel connection between the ram and the reciprocatory element; a die; a broach tool connected to the ram and extending through and cooperating with the die; means providing for simultaneous turning of the die, ram, and the tool carried by the latter; and a stripper cooperating with the tool and constructed and arranged to provide for the turning movement of the latter.

2. In a cutting machine, the combination of a vertically disposed die; a vertical ram arranged below the die; a broach tool connected to the ram and extending through the die, said tool embodying an upper cutting portion having a cutting edge which overhangs at the feed side a feed-limiting portion arranged immediately therebelow; means providing for turning of the ram, tool and die about the ram axis; and a stripper above the die, cooperating with the tool, and constructed and arranged to provide for turning movement of the tool relatively thereto.

3. In a cutting machine, the combination of a frame, a rotarily adjustable head carried by the frame and having a guide bore, a thrust bearing between the said head and frame, a die carried by the head, a reciprocatory ram fitting the bore, means providing for the transmission of rotary motion from the head to the ram while permitting of relative sliding movement, and a tool connected to the ram and extending through the die, said tool embodying an enlarged outer portion providing a cutting face and an adjacent feed increment limiting portion.

4. In a cutting machine, the combination of a support, a head journalled in place with respect to the support and having a guide bore, a ram in the bore, means for slidably and non-rotatably connecting the head and ram, a tool carried by the ram, said tool having a straight back and being relieved at the front to provide adjacent cutting face and feed-limiting elements, a die supported by said head and having a guide opening engaging the back side of said tool and adapted to cooperate with said cutting face element, means for turning the head, and a stripper for cooperation with the tool.

5. In a cutting machine, the combination of a die structure embodying a cylindrical holder and a die carried thereby, a tool structure embodying a cylindrical holder and a cutting tool carried thereby and cooperating with the die, a reciprocatory ram, means providing a guide for the ram and a support for the die structure, a tool structure support carried by the ram, said die and tool structure supports having aligned cylindrical openings, and means cooperating with said supports to contract the openings to grip the die and tool structures.

6. In a cutting machine, the combination of a die, a reciprocatory broach tool movable through the die and having a cutting face at one side which overhangs an adjacent feed-limiting portion, means for supporting the die and tool in proper relative positions and providing for reciprocation of the tool, a stripper arranged above the die and cooperating with the tool, means for raising and lowering the stripper, and means providing for adjusting of the stripper toward and away from the die.

7. In a cutting machine, the combination of a guide, a reciprocatory member arranged in the guide, a cutting tool carried by said member, a die cooperating with the tool, a support having an overhanging upper portion and a base portion, said upper portion being provided with an opening arranged to axially align with said tool, a holder for the die and arranged in the opening, means provided on the overhanging portion for gripping the holder, and means for securing the base portion in position with respect to the guide and providing for adjustment of the support in all directions in a plane normal to the path of travel of the tool.

8. In a cutting machine, the combination of a guide structure, a reciprocatory member arranged in the guide structure, a cutting tool carried by the reciprocatory member, a die cooperating with the tool, means unitary with the guide structure for supporting the die, and a slidable key connection between the reciprocatory member and the guide structure and including relatively movable elements, and means cooperating with said relatively movable elements for securing relative angular adjustment of the reciprocatory member with respect to the guide structure.

9. In a cutting machine, the combination of a guide structure, a reciprocatory member carried by the guide structure, a cutting tool carried by said member, a die cooperating with the stool, a die support unitary with the guide structure, a slidable key connection between the reciprocatory member and the guide structure, a bearing encompassing the guide structure for supporting the latter and providing for angular movement thereof, and means for angularly adjusting the guide structure with respect to the bearing.

10. In a cutting machine, the combination of a guide structure, a reciprocatory member carried by the guide structure, a cutting tool carried by said member, a die cooperating with the tool, a die support connected to the guide structure, a slidable key connection between the reciprocatory member and the guide structure, a bearing encompassing the guide structure for supporting the latter and providing for angular movement thereof, means for angularly adjusting the guide structure with respect to said bearing, and detent means for holding the guide structure in predetermined positions of adjustment.

11. In a cutting machine, the combination of a guide structure, a reciprocatory member carried by the guide structure, a cutting tool carried by said member, a die cooperating with the tool, a die support connected to the guide structure, a slidable key connection between the reciprocatory member and the guide structure, a bearing encompassing the guide structure for supporting the latter and providing for angular movement thereof, a gear member carried by the guide structure, a pinion member meshing with the gear member, means for supporting the pinion member in meshing position, and an operating member connected to the pinion member.

12. In a cutting machine, the combination of a guide structure, a reciprocatory member carried by the guide structure, a cutting tool carried by said member, a die cooperating with the tool, a die support connected to the guide structure, a slidable key connection between the reciprocatory member and the guide structure, a bearing encompassing the guide structure for supporting the latter and providing for angular movement thereof, a gear member carried by the guide structure, a pinion member meshing with the gear member, means for supporting the pinion member in meshing position and providing for angular adjustment thereof about the axis of said gear, and an operating member connected to the pinion member.

13. In a cutting machine, the combination of a guide structure, a reciprocatory member carried by the guide structure, a cutting tool carried by said member, a die cooperating with the tool, a die support connected to the guide structure, a slidable key connection between the reciprocatory member and the guide structure, a bearing encompassing the guide structure for supporting the latter and providing for angular movement thereof, a gear carried by the guide structure, a pinion meshing with the gear, supporting means for the pinion journalled about said bearing, and an operating member for the pinion.

14. In a cutting machine, the combination of a guide structure, a reciprocatory member carried by the guide structure, a cutting tool carried by said member, a die cooperating with the tool, a support for the die structure, a slidable key connection between the reciprocatory member and the guide structure, a bearing encompassing the guide structure for supporting the latter and providing for angular movement thereof, a thrust bearing arranged between the upper end of the bearing and the guide structure, means for securing angular adjustment of the guide structure with respect to the bearing, and supporting means for the last-named means and angularly adjustable about said bearing.

15. In a cutting machine, the combination of a die, a reciprocatory broach tool cooperating with the die, a stripper arranged above the die and cooperating with the tool, means for raising the stripper above the tool and for lowering it to a position of operative relation with respect to the tool, and means providing for adjustment of the stripper to vary the distance thereof from the die to accommodate work of different thicknesses.

16. In a cutting machine, the combination of a die, a frame for supporting the die and provided with a vertically-disposed bearing below the die, a journal member fitting the bearing and having an axial guide bore below the die, a ram fitting the guide bore, a cutting tool carried by the upper end of the ram and cooperating with the die, means for reciprocating the ram, a slidable key connection between the journal member and the ram, and means for angularly adjusting the journal member.

17. In a cutting machine, the combination of a die, a ram arranged below the die, a cutting tool connected to the upper end of the ram and cooperating with the die, a frame for supporting the die and having a guide construction providing for rectilinear movement of the ram and angular adjustment thereof about its longitudinal axis, driving mechanism including a reciprocatory element, a swivel connection between the lower end of the ram and the reciprocatory element, and means for adjusting the ram angularly about its longitudinal axis.

18. In a cutting machine, the combination of a frame including pedestal structure, a die supported from the frame, a vertical bearing provided in the pedestal structure and arranged below the die, a guide member journalled in the bearing and having a vertical guide bore below the die, a ram fitting the guide bore, a cutting tool carried by the upper end of the ram and cooperating with the die, driving mechanism carried by the pedestal structure and including a reciprocatory element, a swivel connection between the ram and the reciprocatory element, a slidable key connection between the guide member and the ram, and means for angularly adjusting the guide member.

19. In a cutting machine, the combination of a die, a frame for supporting the die and having a vertical bore arranged below the die, a ram fitting the bore and turnable with respect to the frame, and a cutting tool carried eccentrically by the upper end of the ram, the freedom of the ram to turn and the eccentric mounting of the tool providing for turning of the latter due to the pressure of work exerted laterally of the tool.

20. In a cutting machine, the combination of a die, means providing a ram bore, a ram fitting the bore, a tool connected eccentrically to one end of the ram and cooperating with the die, and a support for the die angularly adjustable about the axis of the ram, said eccentric mounting of the tool and the angular adjustability of the die support providing for turning of the tool due to pressure of work exerted laterally thereon.

21. In a cutting machine, the combination of a die, a reciprocatory cutting tool cooperating with the die, cylindrical holders for the die and the cutting tool, supports for the die and the tool holders having coaxial cylindrical openings whose walls engage the holders circumferentially and including means for securing circumferential gripping of the holders by the walls, a ram having one end connected to the tool support, a guide for the ram and having its axis coincident with or parallel to the axis of said cylindrical openings, and means for reciprocating the ram.

In testimony whereof, I have hereunto subscribed my name this 20th day of Nov., 1929.

CHARLES B. GRAY.